United States Patent
Shi et al.

(10) Patent No.: US 11,388,028 B2
(45) Date of Patent: Jul. 12, 2022

(54) COMMUNICATION METHOD AND DEVICE BASED ON PARALLEL SYSTEM, AND TERMINAL

(71) Applicants: KEHUA HENGSHENG CO., LTD., Fujian (CN); ZHANGZHOU KEHUA TECHNOLOGY CO., LTD., Fujian (CN)

(72) Inventors: Shaopeng Shi, Fujian (CN); Wei Wang, Fujian (CN); Chi Zhang, Fujian (CN)

(73) Assignees: KEHUA HENGSHENG CO., LTD., Xiamen (CN); ZHANGZHOU KEHUA TECHNOLOGY CO., LTD., Zhangzhou (CN)

( * ) Notice: Subject to any disclaimer, the term of this patent is extended or adjusted under 35 U.S.C. 154(b) by 0 days.

(21) Appl. No.: 17/257,317

(22) PCT Filed: Mar. 25, 2020

(86) PCT No.: PCT/CN2020/081067
§ 371 (c)(1),
(2) Date: Dec. 31, 2020

(87) PCT Pub. No.: WO2021/056995
PCT Pub. Date: Apr. 1, 2021

(65) Prior Publication Data
US 2021/0367814 A1    Nov. 25, 2021

(30) Foreign Application Priority Data

Sep. 24, 2019  (CN) .......................... 201910906096.0

(51) Int. Cl.
*H04L 25/02* (2006.01)
*H04L 12/40* (2006.01)

(52) U.S. Cl.
CPC .... *H04L 25/0272* (2013.01); *H04L 12/40006* (2013.01); *H04L 25/0292* (2013.01)

(58) Field of Classification Search
CPC .......... H04L 12/40006; H04L 25/0276; H04L 25/0292
See application file for complete search history.

(56) References Cited

U.S. PATENT DOCUMENTS

| | | | |
|---|---|---|---|
| 6,735,704 B1 * | 5/2004 | Butka | H02J 3/38 713/300 |
| 9,843,188 B2 * | 12/2017 | Chen | H02J 9/00 |

(Continued)

FOREIGN PATENT DOCUMENTS

| | | |
|---|---|---|
| CN | 1581633 A | 2/2005 |
| CN | 106165242 A | 11/2016 |

(Continued)

OTHER PUBLICATIONS

International Search Report for PCT/CN2020/081067 dated Jun. 16, 2020, ISA/CN.

*Primary Examiner* — David B Lugo
(74) *Attorney, Agent, or Firm* — Slater Matsil, LLP

(57) ABSTRACT

A communication method and a communication device based on a parallel system, a terminal and a computer readable storage medium are provided. The parallel system includes a fieldbus and two or more communication nodes connected to the fieldbus in parallel. The communication method includes: acquiring a status parameter of a target communication node; converting the status parameter into a logic level signal; generating an input differential signal based on the logic level signal; sending the input differential signal to the fieldbus and synchronously receiving an output differential signal from the fieldbus, where the output differential signal is generated by the fieldbus by performing a wired-AND operation on input differential signals received (Continued)

from the two or more communication nodes; and acquiring information of the communication nodes connected to the fieldbus based on the output differential signal.

7 Claims, 5 Drawing Sheets

(56) References Cited

U.S. PATENT DOCUMENTS

| | | | |
|---|---|---|---|
| 2004/0215693 A1* | 10/2004 | Thompson | G08C 19/00 709/201 |
| 2018/0254660 A1 | 9/2018 | Patel et al. | |
| 2020/0274731 A1* | 8/2020 | Antonsson | H04L 12/4625 |

FOREIGN PATENT DOCUMENTS

| | | |
|---|---|---|
| CN | 108462249 A | 8/2018 |
| CN | 110740085 A | 1/2020 |
| EP | 3072209 B1 | 9/2016 |

* cited by examiner

COMMUNICATION METHOD AND DEVICE BASED ON PARALLEL SYSTEM, AND TERMINAL

CROSS REFERENCE OF RELATED APPLICATION

This application is the national phase of International Application No. PCT/CN2020/081067, titled "COMMUNICATION METHOD AND DEVICE BASED ON PARALLEL SYSTEM, AND TERMINAL", filed on Mar. 25, 2020, which claims the priority to Chinese Patent Application No. 201910906096.0, titled "COMMUNICATION METHOD AND DEVICE BASED ON PARALLEL SYSTEM, AND TERMINAL", filed on Sep. 24, 2019 with the China National Intellectual Property Administration, which are incorporated herein by reference in their entireties.

FIELD

The present disclosure relates to the technical field of communications, and in particular to a communication method and a communication device based on a parallel system, a terminal and a computer readable storage medium.

BACKGROUND

A parallel system refers to a system formed by multiple device nodes independently connected to a same transmission line (such as a bus). The parallel system is widely used in various scenarios. For example, multiple uninterruptible power supplies (UPS) may form a parallel UPS system, to provide a stable and uninterruptible power supply for a load. For another example, multiple inverter modules in a modular UPS may form a parallel system.

A communication method performed by a parallel system according to the conventional technically usually focuses on communication between multiple nodes and a main control unit, but ignores communication among the multiple nodes in the parallel system. For example, in a case that output power of one UPS node in the parallel UPS system is greater than output power of other UPS nodes in the parallel UPS system, the other UPS nodes may be affected. Therefore, nodes in the parallel UPS system are required to exchange information to determine whether their respective output power match.

Furthermore, the conventional bus system, for example, a controller area network (CAN), adopts an arbitration mechanism. That is, nodes send information in sequence according to priorities of data, and multiple nodes cannot send information to a bus simultaneously, resulting in a low rate of data exchange.

SUMMARY

In view of this, a communication method and a communication device based on a parallel system, a terminal and a computer readable storage medium are provided according to the present disclosure, to realize communication among nodes in the parallel system, and solve a problem of low rate of data exchange in the parallel system according to the conventional technology.

A communication method based on a parallel system is provided according to a first aspect of embodiments of the present disclosure. The parallel system includes a fieldbus and two or more communication nodes connected to the fieldbus in parallel. The communication method includes: acquiring a status parameter of a target communication node; converting the status parameter into a logic level signal; generating an input differential signal based on the logic level signal; sending the input differential signal to the fieldbus and synchronously receiving an output differential signal from the fieldbus, where the output differential signal is generated by the fieldbus by performing a wired-AND operation on input differential signals received from the two or more communication nodes; and acquiring information of the communication nodes connected to the fieldbus based on the output differential signal.

A communication device based on a parallel system is provided according to a second aspect of embodiments of the present disclosure. The parallel system includes a fieldbus and two or more communication nodes connected to the fieldbus in parallel. The communication device includes a status parameter acquiring unit, a logic level converting unit, a differential signal generating unit, a differential signal transceiving unit, and a node information analyzing unit. The status parameter acquiring unit is configured to acquire a status parameter of a target communication node. The logic level converting unit is configured to convert the status parameter into a logic level signal. The differential signal generating unit is configured to generate an input differential signal based on the logic level signal. The differential signal transceiving unit is configured to send the input differential signal to the fieldbus and synchronously receive an output differential signal from the fieldbus. The output differential signal is generated by the fieldbus by performing a wired-AND operation on input differential signals received from the two or more communication nodes. The node information analyzing unit is configured to acquire information of the communication nodes connected to the fieldbus based on the output differential signal.

A terminal is provided according to a third aspect of embodiments of the present disclosure. The terminal includes a memory, a processor and a computer program stored in the memory and capable of running in the processor. The processor, when executing the computer program, implements steps of the aforementioned communication method based on a parallel system.

A computer readable storage medium is provided according to a fourth aspect of embodiments of the present disclosure. The computer readable storage medium stores a computer program. The computer program, when executed by a processor, implements steps of the aforementioned communication method based on a parallel system.

According to the present disclosure, a status parameter of a target communication node is acquired, and is converted into a logic level signal. An input differential signal is generated based on the logic level signal, and is sent to the fieldbus. Communication nodes connected to the fieldbus send input differential signals corresponding to their respective status parameters to the fieldbus synchronously. The fieldbus performs the wired-AND operation on the received input differential signals from these communication nodes to generate the output differential signal. For example, in a case that input differential signals all have a value of 1, the output differential signal has a value of 0. In a case that an input differential signal among these input differential signals has a value of 0, the output differential signal has a value of 1. Therefore, the output differential signal can reflect whether the status parameters of these communication nodes connected to the fieldbus match. According to the present disclosure, the target communication node may receive the output differential signal from the fieldbus, and acquire the information of these communication nodes connected to the fieldbus based on the output differential signal. It can be seen that according to the present disclosure, communication nodes connected to the fieldbus can exchange information with each other, and can send data synchronously without priority arbitration, thereby improving rate of data interchange.

BRIEF DESCRIPTION OF THE DRAWINGS

In order to more clearly illustrate technical solutions in embodiments of the present disclosure, drawings to be used in the embodiments or the conventional technology are described briefly hereinafter. It is apparent that the drawings described below illustrate only some embodiments of the present disclosure, and other drawings may be obtained by those skilled in the art based on these drawings without any creative effort.

DETAILED DESCRIPTION

Specific details such as a specific system structure and technology are proposed hereinafter for illustration rather than limitation, to provide a thorough understanding of embodiments of the present disclosure. However, those skilled in the art should clearly understand that, the present disclosure may be implemented by other embodiments without these specific details. Further, detailed descriptions of well-known systems, devices, circuits, and methods are omitted, to prevent unnecessary details from obstructing the description of the present disclosure.

To make the objects, technical solutions, and advantages of the embodiments of the present disclosure clearer, the technical solutions of the present disclosure are described hereinafter in conjunction with the drawings in the embodiments of the present disclosure.

A parallel system in embodiments of the present disclosure includes a fieldbus and two or more communication nodes connected to the fieldbus in parallel. In an example, the parallel system may be a parallel UPS system, and each communication node corresponds to one UPS. In another example, the parallel system may be formed by multiple inverter modules in a modular UPS. Each communication node corresponds to one inverter module. The multiple inverter modules are connected in parallel.

Figure 1:
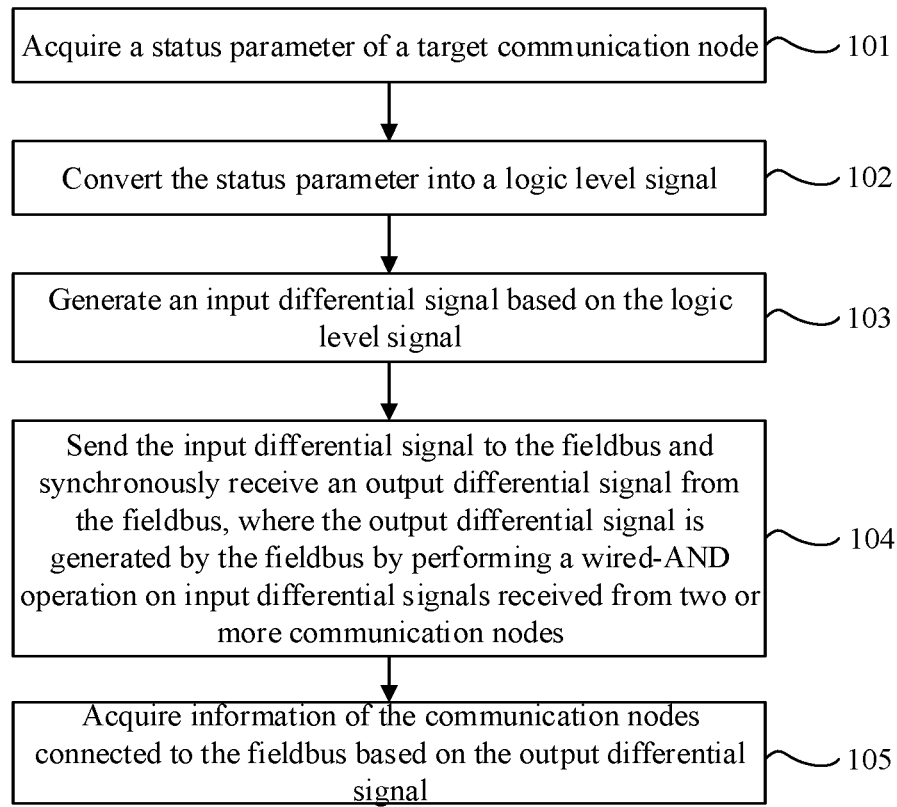
FIG. 1 is a flowchart of a communication method based on a parallel system according to an embodiment of the present disclosure.

Reference is made to FIG. 1, which is a flowchart of a communication method based on a parallel system according to an embodiment of the present disclosure. The communication method includes the following steps 101 to 105.

In step 101, a status parameter of a target communication node is acquired.

In the embodiment of the present disclosure, the target communication node is a communication node in the parallel system. The target communication node may perform the communication method according to the embodiment of the present disclosure.

In an example, the target communication node is a UPS, or an inverter module in a modular UPS. The status parameter may be output power of the UPS or the inverter module. The UPS or inverter module acquires its output power when starting, and sends the output power to the fieldbus as the status parameter.

In another example, the status parameter may be voltage parameter information, current parameter information or fault parameter information of the UPS or inverter module.

In step 102, the status parameter is converted into a logic level signal.

A logic level is a state in which a signal is generated, and is usually represented by a potential difference between a signal and ground. A range of the logic level is determined by characteristics of different devices in a logic family.

In an embodiment, the logic level signal corresponding to the status parameter may be set as a high level in a case that the status parameter has a specified value, and the logic level signal corresponding to the status parameter may be set as a low level in a case that the status parameter does not has the specified value. Alternatively, the logic level signal corresponding to the status parameter may be set as a low level in a case that the status parameter has a specified value, and the logic level signal corresponding to the status parameter may be set as a high level in a case that the status parameter does not has the specified value. According to the above flexible setting, the status parameter can be converted into the logic level signal, so as to realize digital communication.

In step 103, an input differential signal is generated based on the logic level signal.

In the embodiment of the present disclosure, the fieldbus may be connected in a physical connection form of the existing CAN bus. A CAN transceiver converts the logic level signal sent by the communication node into the input differential signal, so as to send the input differential signal to the fieldbus.

In step 104, the input differential signal is sent to the fieldbus, and an output differential signal from the fieldbus is received synchronously. The output differential signal is generated by the fieldbus by performing a wired-AND operation on input differential signals received from the communication nodes.

In the embodiment of the present disclosure, the fieldbus may synchronously receive input differential signals from multiple communication nodes, and perform the wired-AND operation on the input differential signals to generate the output differential signal. The output differential signal generated by performing the wired-AND operation reflects whether status parameters of the communication nodes connected to the fieldbus match.

For example, in a case that the input differential signals received synchronously by the fieldbus from the multiple communication nodes are all in a high level, the fieldbus performs the wired-AND operation to generate an output differential signal in a high level. In a case that any one of the input differential signals received synchronously by the fieldbus from the multiple communication nodes is in a low level, the fieldbus performs the wired-AND operation to generate an output differential signal in a low level. That is, in a case that the output differential signal is in low level, the status parameters of the communication nodes does not match.

In step 105, information of the communication nodes connected to the fieldbus is acquired based on the output differential signal.

In the embodiment of the present disclosure, the target communication node may receive the output differential signal from the fieldbus, and convert the received output differential signal into a logic level signal for logic analysis, so as to determine whether the status parameters of the communication nodes connected to the fieldbus match.

Figure 2:
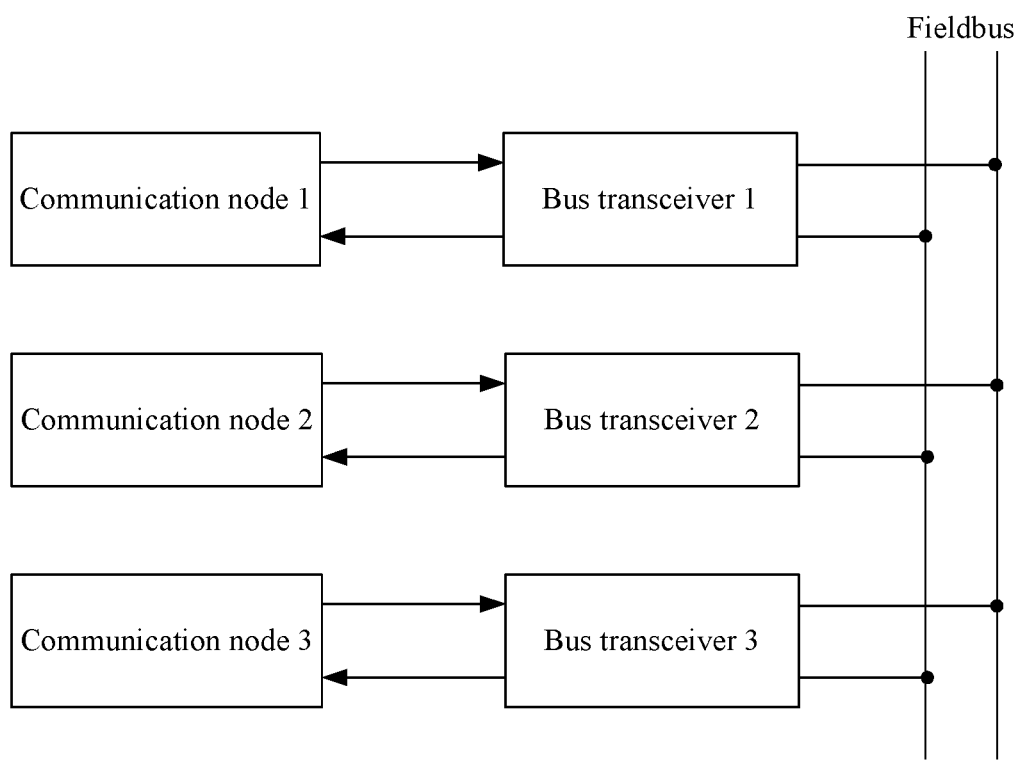
FIG. 2 is a schematic diagram showing physical connection of a parallel system according to an embodiment of the present disclosure.

FIG. 2 is a schematic diagram showing physical connection of a parallel system according to an embodiment of the present disclosure. As shown in FIG. 2, multiple communication nodes (1, 2, and 3) are connected to a fieldbus via bus transceivers (1, 2, and 3), respectively. A communication node is configured to acquire a status parameter, and convert the status parameter into a logic level signal. A bus transceiver is configured to receive the logic level signal, convert the logic level signal into an input differential signal, and send the input differential signal to the fieldbus. An output differential signal returned by the fieldbus is generated by performing the wired-AND operation on multiple input differential signals. The bus transceiver is further configured to convert the output differential signal from the fieldbus into a logic level signal, and send the logic level signal to the communication node. The communication node performs information analysis based on the received logic level signal.

In the embodiment of the present disclosure, the fieldbus may be a CAN bus, the bus transceiver may be a CAN transceiver, and the communication node may be a field-programmable gate array (FPGA), or a complex programmable logic device (CPLD). The FPGA or CPLD is connected to a first input end (CAN-TX) and a first output end (CAN-RX) of the CAN transceiver via two general-purpose input/output (GPIO) ports of the FPGA or CPLD as a sending interface and a receiving interface. The CAN transceiver is connected to the CAN bus via a second input terminal (CAN-H) and a second output terminal (CAN-L).

It can be seen from the above that according to the present disclosure, the status parameter of the target communication node is acquired, and is converted into the logic level signal. The input differential signal is generated based on the logic level signal, and is sent to the fieldbus. Communication nodes connected to the fieldbus send input differential signals corresponding to their respective status parameters to the fieldbus synchronously. The fieldbus performs the wired-AND operation on input differential signals received from these communication nodes to generate the output differential signal. For example, in a case that input differential signals all have a value of 1, the output differential signal has a value of 0. In a case that an input differential signal among these input differential signals has a value of 0, the output differential signal has a value of 1. Therefore, the output differential signal can reflect whether the status parameters of these communication nodes connected to the fieldbus match. According to the present disclosure, the target communication node may receive the output differential signal from the fieldbus, and acquire the information of these communication nodes connected to the fieldbus based on the output differential signal. It can be seen that according to the present disclosure, communication nodes connected to the fieldbus can exchange information with each other, and can send data synchronously without priority arbitration, thereby improving rate of data interchange.

Figure 3:
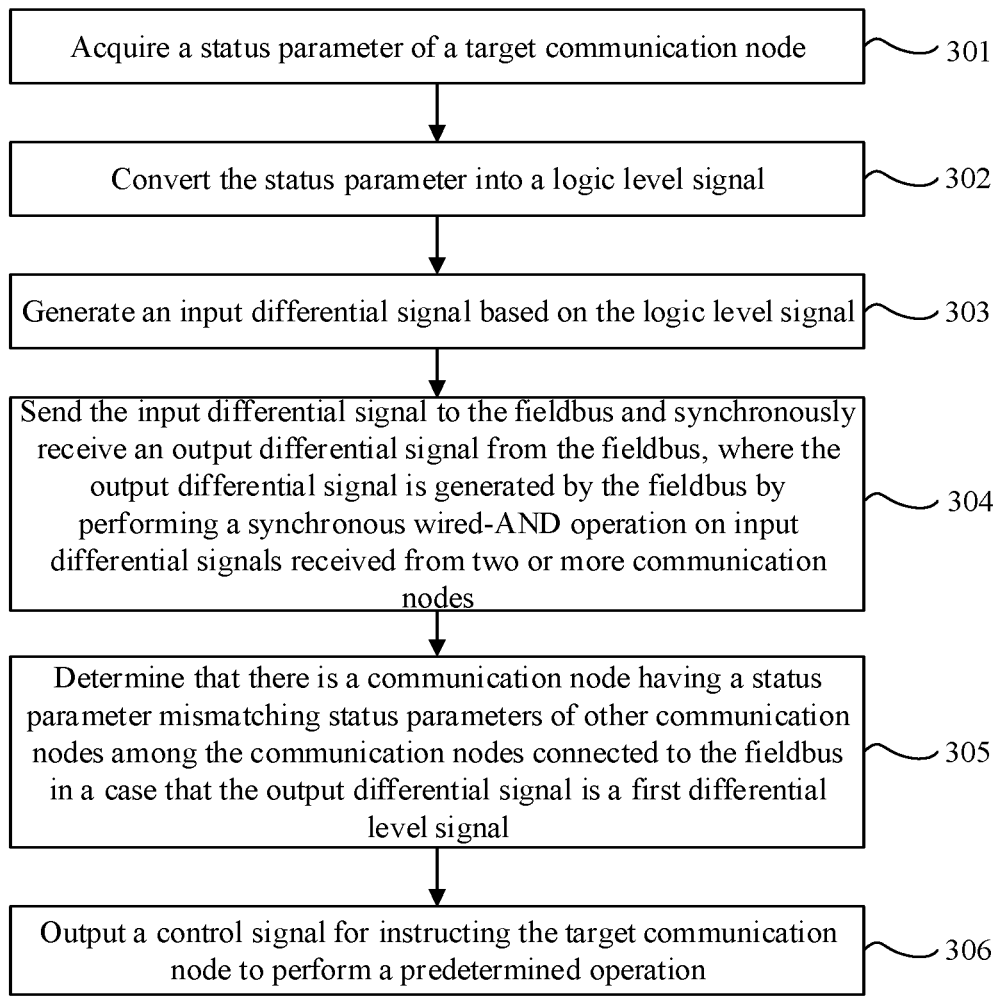
FIG. 3 is a flowchart of a communication method based on a parallel system according to another embodiment of the present disclosure.

FIG. 3 is a flowchart of a communication method based on a parallel system according to another embodiment of the present disclosure. The communication method includes the following steps 301 to 306.

In step 301, a status parameter of a target communication node is acquired.

In step 302, the status parameter is converted into a logic level signal.

In step 303, an input differential signal is generated based on the logic level signal.

In step 304, the input differential signal is sent to a fieldbus, and an output differential signal from the fieldbus is received synchronously. The output differential signal is generated by the fieldbus by performing a wired-AND operation on input differential signals received from these communication nodes.

The above steps 301 to 304 in this embodiment may respectively refer to the aforementioned steps 101 to 104 described in the embodiment shown in FIG. 1, and are not described in detail here.

In step 305, it is determined that there is a communication node having a status parameter mismatching status parameters of other communication nodes among the communication nodes connected to the fieldbus in a case that the output differential signal is a first differential level signal.

In step 306, it is determined that status parameters of the communication nodes connected to the fieldbus all match in a case that the output differential signal is a second differential level signal.

In the embodiment of the present disclosure, the output differential signal may include the first differential level signal and the second differential level signal. The first differential level signal may be a differential level signal in low level, or may be a differential level signal in high level. The target communication node, when detecting that the received output differential signal is a differential level signal in low level, may determine that there is a communication node having a status parameter mismatching status parameters of other communication nodes among the communication nodes connected to the fieldbus. The target communication node, when detecting that the received output differential signal is a differential level signal in high level, may determine that status parameters of the communication nodes connected to the fieldbus all match.

In an alternative embodiment, after the step 305, the communication method further includes the following step of: outputting a control signal for instructing the target communication node to perform a predetermined operation.

In the embodiment of the present disclosure, since there is a communication node having a status parameter mismatching status parameters of other communication nodes among the communication nodes connected to the fieldbus, the control signal for instructing the target communication node to perform the predetermined operation is outputted.

In an alternative embodiment, the communication node includes an uninterruptible power supply, the status parameter includes output power, and the predetermined operation includes a shutdown operation.

In the embodiment of the present disclosure, the target communication node is a UPS, and the acquired status parameter may be output power of the UPS. A target UPS, when detecting that there is output power of a UPS mismatching output power of other UPSs among UPSs connected to the fieldbus, may perform the shutdown operation, to avoid device damage due to mismatching output power of the UPSs connected in parallel.

Optionally, before the step 301, the communication method further includes the following steps of: determining whether the target communication node is a master node in the parallel system; and outputting a synchronization signal in a case that the target communication node is the master node, where the synchronization signal instructs the communication nodes connected to the fieldbus to synchronize signal data bits.

In the embodiment of the present disclosure, the master node is configured to output the synchronization signal, so that other communication nodes connected to the fieldbus can synchronize signal data bits together with the master node. Before communicating, the nodes are required to synchronize the data bits. Each communication node may determine whether it is the master node in the parallel system when being connected to the fieldbus. A communication node determined as the master node outputs the synchronization signal. A communication node determined as not the master node receives the synchronization signal from the master node, and synchronizes the signal data bits together with other communication nodes connected to the fieldbus based on the synchronization signal.

Optionally, the determining whether the target communication node is a master node in the parallel system includes: sending a master-slave competition signal to the fieldbus and synchronously receiving a signal returned by the fieldbus, where the master-slave competition signal includes a flag bit; determining that the target communication node is not the master node in the parallel system, in a case that a flag bit in the returned signal is different from the flag bit in the sent master-slave competition signal and a priority of the flag bit in the returned signal is higher than a priority of the flag bit in the sent master-slave competition signal; and determining that the target communication node is the master node in the parallel system, in a case that a flag bit in the returned signal is the same as the flag bit in the sent master-slave competition signal or in a case that a priority of a flag bit in the returned signal is not higher than a priority of the flag bit in the sent master-slave competition signal.

In the embodiment of the present disclosure, each communication node may send a master-slave competition signal including a flag bit when being connected to the fieldbus. A communication node with a highest priority of the flag bit serves as the master node, and other communication nodes serve as slave nodes.

For example, a node 1 sends a master-slave competition signal (ID1) of "11111110", and a flag bit "0" thereof is in a last bit of the master-slave competition signal (ID1). A node 2 sends a master-slave competition signal (ID2) of "11111101", and a flag bit "0" thereof is in a penultimate bit of the master-slave competition signal (ID2). The fieldbus processes the signals sent by node 1 and node 2, and feeds back processed data to the node 1 and the node 2. The node 1 receives data of "11111100" from the fieldbus. This data of "11111100" is different from ID1 (11111110) sent by the node 1, and has a flag bit with a priority (represented by a highest bit in the penultimate bit) higher than a priority of the flag bit of ID1. In this case, the node 1 stops competing for the master node or remains as a slave node. The node 2 receives data of "11111100" from the fieldbus. Although this data is different from ID2 sent by the node 2, this data has no flag bit with a priority higher than a priority of the flag bit of ID2 (where the flag bit of ID2 is represented by a penultimate bit of the ID2, and the flag bit of the data fed back by the fieldbus is also represented by a highest bit in a penultimate bit of the data). Therefore, the node 2 becomes the master node or remains as the master node.

In a case that there are multiple nodes in the parallel system, a master node in the parallel system is determined based on the same mechanism as above.

It can be seen from the above that according to the present disclosure, the status parameter of the target communication node is acquired, and is converted into the logic level signal. The input differential signal is generated based on the logic level signal, and is sent to the fieldbus. Communication nodes connected to the fieldbus send input differential signals corresponding to their respective status parameters to the fieldbus synchronously. The fieldbus performs the wired-AND operation on input differential signals received from these communication nodes to generate the output differential signal. For example, in a case that input differential signals all have a value of 1, the output differential signal has a value of 0. In a case that an input differential signal among these input differential signals has a value of 0, the output differential signal has a value of 1. Therefore, the output differential signal can reflect whether the status parameters of these communication nodes connected to the fieldbus match. According to the present disclosure, the target communication node may receive the output differential signal from the fieldbus, and acquire the information of these communication nodes connected to the fieldbus based on the output differential signal. It can be seen that according to the present disclosure, communication nodes connected to the fieldbus can exchange information with each other, and can send data synchronously without priority arbitration, thereby improving rate of data interchange.

It should be understood that, serial numbers of the steps in the foregoing embodiments do not refer to a sequence according to which the steps are performed. The sequence according to which the steps are performed is determined by functions and internal logic thereof, and should not constitute any limitation on the implementation process of the embodiments of the present disclosure.

Device embodiments of the present disclosure are described hereinafter, and reference may be made to the corresponding aforementioned method embodiments for details which are not described.

Figure 4:
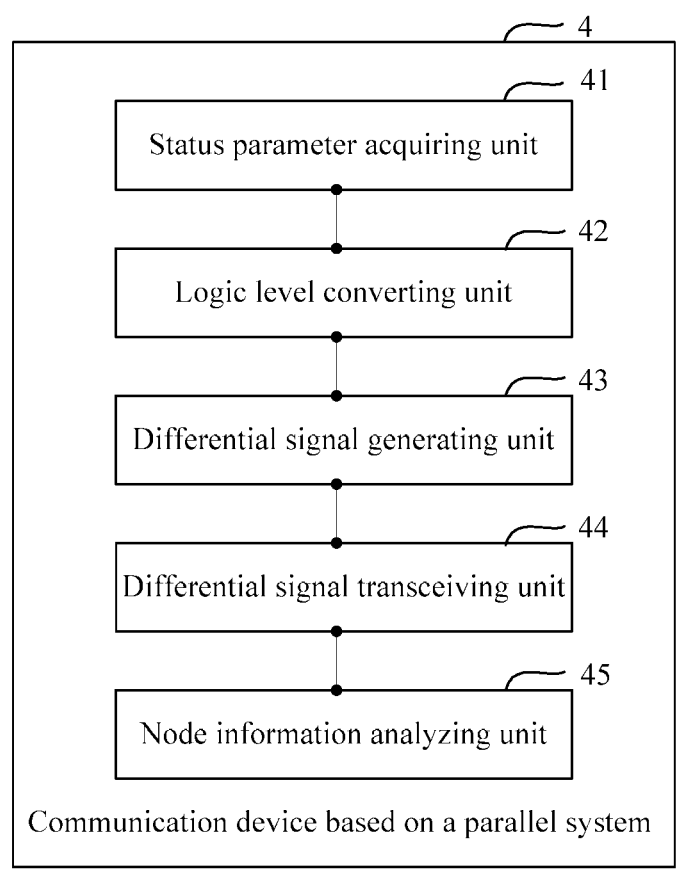
FIG. 4 is a schematic structural diagram of a communication device based on a parallel system according to an embodiment of the present disclosure.

FIG. 4 is a schematic structural diagram of a communication device based on a parallel system according to an embodiment of the present disclosure. For ease of description, only parts related to the embodiments of the present disclosure are shown, and are described in detail as follows.

Referring to FIG. 4, the communication device 4 based on a parallel system includes a status parameter acquiring unit 41, a logic level converting unit 42, a differential signal generating unit 43, a differential signal transceiving unit 44, and a node information analyzing unit 45.

The status parameter acquiring unit 41 is configured to acquire a status parameter of a target communication node.

The logic level converting unit 42 is configured to convert the status parameter into a logic level signal.

The differential signal generating unit 43 is configured to generate an input differential signal based on the logic level signal.

The differential signal transceiving unit 44 is configured to send the input differential signal to the fieldbus and synchronously receive an output differential signal from the fieldbus. The output differential signal is generated by the fieldbus by performing a wired-AND operation on input differential signals received from communication nodes.

The node information analyzing unit 45 is configured to acquire information of the communication nodes connected to the fieldbus based on the output differential signal.

Optionally, the output differential signal includes a first differential level signal and a second differential level signal. The node information analyzing unit 45 is configured to: determine that there is a communication node having a status parameter mismatching status parameters of other communication nodes among the communication nodes connected to the fieldbus in a case that the output differential signal is the first differential level signal; and determine that status parameters of the communication nodes connected to the fieldbus all match in a case that the output differential signal is the second differential level signal.

Optionally, the communication device 4 based on a parallel system further includes a control unit. The control unit is configured to: output a control signal for instructing the target communication node to perform a predetermined operation after it is determined that there is a communication node having a status parameter mismatching status parameters of other communication nodes among the communication nodes connected to the fieldbus in a case that the output differential signal is the first differential level signal.

Optionally, the communication node includes an uninterruptible power supply, the status parameter includes output power, and the predetermined operation includes a shutdown operation.

Optionally, the communication device 4 based on a parallel system further includes a determining unit and a synchronizing unit. The determining unit is configured to determine whether the target communication node is a master node in the parallel system before the status parameter acquiring unit 41 acquires the status parameter of the target communication node. The synchronizing unit is configured to output a synchronization signal in a case that the target communication node is the master node. The synchronization signal instructs the communication nodes connected to the fieldbus to synchronize signal data bits.

Optionally, the synchronizing unit is further configured to receive the synchronization signal, and synchronize, together with other communication nodes connected to the fieldbus, signal data bits based on the synchronization signal in a case that the target communication node is not the master node.

Optionally, the communication device 4 based on a parallel system further includes a master-slave competing unit. The master-slave competing unit is configured to send a master-slave competition signal to the fieldbus and synchronously receive a signal returned by the fieldbus. The master-slave competition signal includes a flag bit. The determining unit is configured to determine that the target communication node is not the master node in the parallel system, in a case that a flag bit in the returned signal is different from the flag bit in the sent master-slave competition signal and a priority of the flag bit in the returned signal is higher than a priority of the flag bit in the sent master-slave competition signal; and determine that the target communication node is the master node in the parallel system, in a case that a flag bit in the returned signal is the same as the flag bit in the sent master-slave competition signal or in a case that a priority of a flag bit in the returned signal is not higher than a priority of the flag bit in the sent master-slave competition signal.

It can be seen from the above that according to the present disclosure, the status parameter of the target communication node is acquired, and is converted into the logic level signal. The input differential signal is generated based on the logic level signal, and is sent to the fieldbus. Communication nodes connected to the fieldbus send input differential signals corresponding to their respective status parameters to the fieldbus synchronously. The fieldbus performs the wired-AND operation on input differential signals received from these communication nodes to generate the output differential signal. For example, in a case that input differential signals all have a value of 1, the output differential signal has a value of 0. In a case that an input differential signal among these input differential signals has a value of 0, the output differential signal has a value of 1. Therefore, the output differential signal can reflect whether the status parameters of these communication nodes connected to the fieldbus match. According to the present disclosure, the target communication node may receive the output differential signal from the fieldbus, and acquire the information of these communication nodes connected to the fieldbus based on the output differential signal. It can be seen that according to the present disclosure, communication nodes connected to the fieldbus can exchange information with each other, and can send data synchronously without priority arbitration, thereby improving rate of data interchange.

Figure 5:
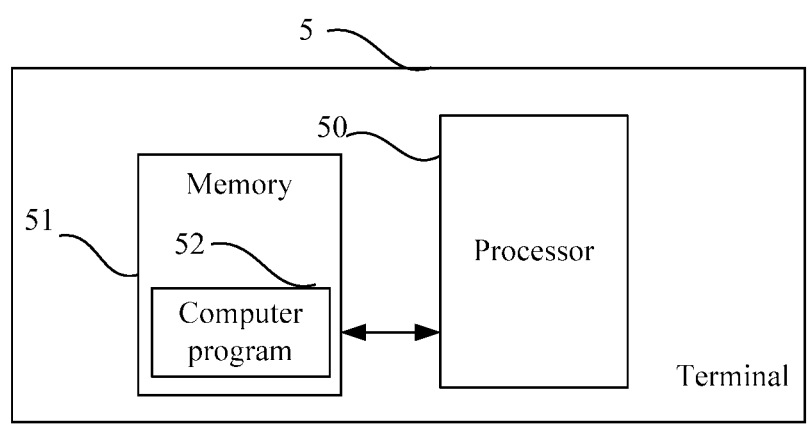
FIG. 5 is a schematic diagram of a terminal according to an embodiment of the present disclosure.

FIG. 5 is a schematic diagram of a terminal according to an embodiment of the present disclosure. Referring to FIG. 5, the terminal 5 in the embodiment includes a processor 50, a memory 51, and a computer program 52 stored in the memory 51 and capable of running in the processor 50. The processor 50, when executing the computer program 52, implements steps, for example, the steps 101 to 105 as shown in FIG. 1, of the aforementioned communication method based on the parallel system. Alternatively, The processor 50, when executing the computer program 52, implements functions of modules/units in the aforementioned device, for example, the functions of units 41 to 45 as shown in FIG. 4.

For example, the computer program 52 may be divided into one or more modules/units. The one or more modules/units are stored in the memory 51 and executed by the processor 50 to complete the implement the present disclosure. The one or more modules/units may be a series of computer program instruction segments capable of completing specific functions. The instruction segments are for describing a process that the computer program 52 is executed in the terminal 5. For example, the computer program 52 may be divided into a status parameter acquiring unit, a logic level converting unit, a differential signal generating unit, a differential signal transceiving unit, and a node information analyzing unit. Functions of these units are described as follows:

The status parameter acquiring unit is configured to acquire a status parameter of a target communication node.

The logic level converting unit is configured to convert the status parameter into a logic level signal.

The differential signal generating unit is configured to generate an input differential signal based on the logic level signal.

The differential signal transceiving unit is configured to send the input differential signal to the fieldbus and synchronously receive an output differential signal from the fieldbus.

The output differential signal is generated by the fieldbus by performing a wired-AND operation on input differential signals received from the two or more communication nodes.

The node information analyzing unit is configured to acquire information of the communication nodes connected to the fieldbus based on the output differential signal.

The terminal 5 may be a computing device such as a desktop computer, a laptop, a palmtop computer, and a cloud server. The terminal may include but is not limited to the processor 50 and the memory 51. Those skilled in the art can understand that FIG. 5 shows merely an example of the terminal 5, and does not constitute a limitation on the terminal 5. The terminal 5 may include more or less components than these shown in the FIG. 5, or a combination of certain components, or different components. For example, the terminal may further include an input and output device, a network access device, a bus and the like.

The processor 50 may be a central processing unit (CPU), a general-purpose processor, a digital signal processor (DSP), an application specific integrated circuit (ASIC), a field-programmable gate array (FPGA) or a programmable logic device, a discrete gate, a transistor logic device, a discrete hardware component or the like. The general-purpose processor may be a microprocessor, any conventional processor or the like.

The memory 51 may be an internal storage unit of the terminal 5, such as a hard disk or a memory of the terminal 5. The memory 51 may also be an external storage device of the terminal 5, such as a plug-in hard disk, a smart memory card (SMC), a secure digital (SD) card, a Flash Card or the like that is equipped on the terminal 5. Further, the memory 51 may include both an internal storage unit and an external storage device of the terminal 5. The memory 51 is configured to store the computer program, and other programs and data required by the terminal. The memory 51 may further be configured to temporarily store data that has been outputted or will be outputted.

Those skilled in the art can clearly understand that, for convenience and conciseness of description, only division of the above-mentioned functional units and modules is described for illustration. In actual applications, the above-mentioned functions may be performed by different functional units and modules as required. That is, an internal structure of the device is divided into different functional units or modules to perform all or part of the functions described above. Functional units or modules in embodiments may be separate physical units or integrated into one processing unit. Alternatively, two or more units may be integrated into one unit. The integrated unit may be implemented in a form of hardware, or may be implemented in a form of a software functional unit. In addition, names of the functional units and modules are only for the convenience of distinguishing each other, and are not for limiting the protection scope of the present disclosure. For an operation process of the units and modules in the above system, reference may be made to the corresponding process in the above method embodiments, which is not repeated here.

In the present disclosure, the description of each embodiment has its own focus. For parts that are not described in detail in an embodiment, reference may be made to related descriptions of other embodiments.

These skilled in the art can further appreciate that units described in combination with the disclosed embodiments may be implemented by electronic hardware, computer software or a combination thereof. Whether these functions are implemented by the hardware or the software is determined by specific applications of the technical solutions and design constraints. For each of the specific applications, those skilled in the art may adopt a specific implementation for the functions described above, and the implementation should fall within the scope of the present disclosure.

In the embodiments of the present disclosure, it should be understood that the device/terminal and the method described herein may be implemented in other ways. The device/terminal embodiments described above are illustrative only. For example, the units or modules are divided merely in logical function, which may be divided by another way in actual implementation. For example, multiple units or components may be combined or integrated into another system, or some features may be ignored or not performed. In addition, coupling or direct coupling or communication connection among shown or discussed parts may be via some interfaces, and indirect coupling or communication connection among devices or units may be electrical, mechanical or other forms.

The above units described as separate components may be or may be not separated physically. The component displayed as a unit may be or may be not a physical unit, that is, may be located at one place or may be distributed on multiple network units. The object of the solution of the embodiments may be achieved by selecting a part or all of the units according to the actual requirements.

Furthermore, functional units in embodiments of the present disclosure may be separate physical units respectively or integrated into one processing unit. Alternatively, two or more units may be integrated into one unit. The integrated unit may be implemented in a form of hardware, or may be implemented in a form of a software functional unit.

The integrated module/unit may be stored in a computer readable storage medium when being implemented in the form of a software functional unit and being sold or used as an independent product. Based on this understanding, all or part of processes in the foregoing method embodiments may also be performed relevant hardware instructed a computer program. The computer program may be stored in a computer readable storage medium. The computer program, when executed by a processor, implements the steps of in foregoing method embodiments. The computer program includes computer program code. The computer program code may be in a form of source code, object code, executable file, or some intermediate form. The computer readable storage medium may include any entity or device, recording medium, U disk, mobile hard disk, magnetic disk, optical disk, computer memory, read-only memory (ROM), random access memory (RAM), electrical carrier signal, telecommunications signal, and software distribution media that are capable of carrying the computer program code. It should be noted that, contents included in the computer readable storage medium may be appropriately added or deleted in accordance with requirements of the legislation and patent practice in the jurisdiction. For example, the computer readable storage medium does not include electrical carrier signals and telecommunication signals according to the legislation and patent practice in some jurisdictions.

The above embodiments are only intended for describing the technical solutions of the present application, and should not be interpreted as limitation to the present disclosure. Although the present disclosure is described in detail with references to the embodiments above described, as those skilled in the art understand, the technical solutions embodied in the above embodiments may be modified, or some technical features may be substituted with the equivalents. These modifications or substitutions do not deviate the nature of the technique from the spirit and scope of the technical solutions embodied in the embodiments according to the present disclosure.

The invention claimed is:

1. A communication method based on a parallel system, wherein the parallel system comprises a fieldbus and two or more communication nodes connected to the fieldbus in parallel, and the communication method comprises:

acquiring a status parameter of a target communication node;

converting the status parameter into a logic level signal;
generating an input differential signal based on the logic level signal;
sending the input differential signal to the fieldbus and synchronously receiving an output differential signal from the fieldbus, wherein the output differential signal is generated by the fieldbus by performing a wired-AND operation on input differential signals received from the two or more communication nodes; and
acquiring information of the communication nodes connected to the fieldbus based on the output differential signal, wherein
before the acquiring a status parameter of a target communication node, the communication method further comprises:
  determining whether the target communication node is a master node in the parallel system; and
  outputting a synchronization signal in a case that the target communication node is the master node, wherein the synchronization signal instructs the communication nodes connected to the fieldbus to synchronize signal data bits; and wherein
the determining whether the target communication node is a master node in the parallel system comprises:
  sending a master-slave competition signal to the fieldbus and synchronously receiving a signal returned by the fieldbus, wherein the master-slave competition signal comprises a flag bit;
  determining that the target communication node is not the master node in the parallel system, in a case that a flag bit in the returned signal is different from the flag bit in the sent master-slave competition signal and a priority of the flag bit in the returned signal is higher than a priority of the flag bit in the sent master-slave competition signal; and
  determining that the target communication node is the master node in the parallel system, in a case that a flag bit in the returned signal is the same as the flag bit in the sent master-slave competition signal or in a case that a priority of a flag bit in the returned signal is not higher than a priority of the flag bit in the sent master-slave competition signal.

2. The communication method based on a parallel system according to claim 1, wherein the output differential signal comprises a first differential level signal and a second differential level signal, wherein the acquiring information of the communication nodes connected to the fieldbus based on the output differential signal comprises:

determining that there is a communication node having a status parameter mismatching status parameters of other communication nodes among the communication nodes connected to the fieldbus in a case that the output differential signal is the first differential level signal; and
determining that status parameters of the communication nodes connected to the fieldbus all match in a case that the output differential signal is the second differential level signal.

3. The communication method based on a parallel system according to claim 2, wherein after the determining that there is a communication node having a status parameter mismatching status parameters of other communication nodes among the communication nodes connected to the fieldbus in a case that the output differential signal is the first differential level signal, the communication method further comprises:
outputting a control signal for instructing the target communication node to perform a predetermined operation.

4. The communication method based on a parallel system according to claim 3, wherein the communication node comprises an uninterruptible power supply, the status parameter comprises output power, and the predetermined operation comprises a shutdown operation.

5. The communication method based on a parallel system according to claim 1, wherein after the determining whether the target communication node is a master node in the parallel system, the communication method further comprises:
receiving a synchronization signal, and synchronizing, together with other communication nodes connected to the fieldbus, signal data bits based on the synchronization signal, in a case that the target communication node is not the master node.

6. A terminal comprising:
a memory;
a processor; and
a computer program stored in the memory and capable of running in the processor, wherein
the processor, when executing the computer program, implements the communication method based on a parallel system according to claim 1.

7. A non-transitory computer readable storage medium storing a computer program, wherein the computer program, when executed by a processor, implements the communication method based on a parallel system according to claim 1.

* * * * *